United States Patent
Rafailovich et al.

(10) Patent No.: US 7,521,499 B2
(45) Date of Patent: *Apr. 21, 2009

(54) FLAME RETARDANT AND UV ABSORPTIVE POLYMETHYLMETHACRYLATE NANOCOMPOSITES

(75) Inventors: Miriam Rafailovich, Plainview, NY (US); Mayu Si, Stony Brook, NY (US); Michael Goldman, Lawrence, NY (US); Jonathan Sokolov, Plainview, NY (US); Benjamin Chu, Setauket, NY (US); Shaoming Zhu, Commack, NY (US)

(73) Assignee: Research Foundation of State University of New York, Albany, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/490,882

(22) PCT Filed: Sep. 27, 2002

(86) PCT No.: PCT/US02/30971

§ 371 (c)(1),
(2), (4) Date: Mar. 26, 2004

(87) PCT Pub. No.: WO03/027175

PCT Pub. Date: Apr. 3, 2003

(65) Prior Publication Data

US 2005/0261413 A1    Nov. 24, 2005

Related U.S. Application Data

(60) Provisional application No. 60/325,942, filed on Sep. 28, 2001.

(51) Int. Cl.
*C08K 9/06* (2006.01)
*C08K 3/34* (2006.01)

(52) U.S. Cl. .................... 524/445; 524/113

(58) Field of Classification Search .......... 524/113, 524/233, 236, 445, 832
See application file for complete search history.

(56) References Cited

U.S. PATENT DOCUMENTS

| | | | |
|---|---|---|---|
| 3,811,904 | A | 5/1974 | Zola |
| 4,303,739 | A | 12/1981 | Beckmann et al. |
| 4,330,414 | A | 5/1982 | Hoover |
| 4,336,301 | A | 6/1982 | Shaw |
| 4,609,714 | A | 9/1986 | Harris et al. |
| 4,668,729 | A | 5/1987 | Kataoka |
| 4,728,439 | A | 3/1988 | Kirker et al. |
| 4,873,116 | A | 10/1989 | Ancker |
| 5,110,667 | A | 5/1992 | Galick et al. |
| 5,171,777 | A | 12/1992 | Kuphal et al. |
| 5,281,651 | A | 1/1994 | Arjunan et al. |
| 5,475,049 | A | 12/1995 | Ohtomo et al. |
| 5,739,087 | A | 4/1998 | Dennis |
| 5,844,032 | A | 12/1998 | Serrano et al. |
| 5,853,886 | A | 12/1998 | Pinnavaia et al. |
| 5,883,192 | A | 3/1999 | Natori et al. |
| 5,993,769 | A | 11/1999 | Pinnavaia et al. |
| 6,132,882 | A | 10/2000 | Landin et al. |
| 6,339,121 | B1 * | 1/2002 | Rafailovich et al. ......... 524/445 |

OTHER PUBLICATIONS

Hasegaw, N., Kawasumi, M., Kato, M., Usuki, A, and Okada, A., "Preparation and Mechanical Properites of Polypropylene-Clay Hybrids Using a Maleic Anhydride-Modified Polypropylene Oligomer," *J. of Applied Polymer Science*, vol. 67, pp. 87-92 (1998).

* cited by examiner

*Primary Examiner*—Kriellion A Sanders
(74) *Attorney, Agent, or Firm*—Hoffman & Baron, LLP

(57) ABSTRACT

A composition which includes polymethylmethacrylate and an organoclay functionalized with intercalation agent, wherein said intercalation agent is a reaction product of a polyamine and an alkyl halide in a polar solvent, preferably a dimethyl, ditallow ammonium functionalized monmorillonite clay as shown in (FIG. 3).

25 Claims, 7 Drawing Sheets

FLAME RETARDANT AND UV ABSORPTIVE POLYMETHYLMETHACRYLATE NANOCOMPOSITES

This application claims priority based on U.S. provisional application No. 60/325,942 filed on Sep. 28, 2001.

This invention was made with Government support under Grant No. DMR0080604 awarded by the National Science Foundation. The Government has certain rights in the invention.

BACKGROUND OF INVENTION

The present invention relates to nanocomposite compositions formed from clay and polymethylmethacrylate (PMMA) and, in particular, compositions formed from functionalized montmorillonite clay and polymethylmethacrylate.

Polymethylmethacrylate, commonly known by the trade names of Plexiglas or Perspex, is a high modulus, high gloss, glassy polymer which is naturally transparent and colorless. Its transmission in the visible range is 92% with an index of refraction of 1.495. Consequently, PMMA is often used as a replacement for glass since it is shatterproof and easily molded. However, PMMA has poor thermal properties and this has been a major disadvantage in further developing PMMA for use in windows or windshields where its high impact and shatter resistant characteristics would be highly beneficial. PMMA is known to ignite quickly and has poor thermal stability. On the other hand, when PMMA burns, it does not emit much smoke and PMMA can also be subjected to large temperature extremes without cracking. Therefore, an improvement in the flame characteristics of PMMA would open new markets for this material as a replacement for glass.

SUMMARY OF THE INVENTION

The present invention relates to a composition which includes polymethylmethacrylate and an organoclay functionalized with an intercalation agent, wherein the intercalation agent is a reaction product of a polyamine and an alkyl halide in a polar solvent. The alkyl halide is preferably alkyl chloride or alkyl bromide and the polar solvent is preferably selected from the group consisting of water, toluene, tetrahydrofuran and dimethylformamide. The preferred organoclay is montmorillonite clay and the most preferred is a di-methyl, di-tallow ammonium functionalized montmorillonite clay.

The compositions include from about 50-98 weight percent polymethylmethacrylate and from about 2-50 weight percent organoclay, preferably from about 70-90 weight percent polymethylmethacrylate and from about 30-10 weight percent organoclay and most preferably from about 80-84 weight percent polymethylmethacrylate and from about 16-20 weight percent organoclay.

The present invention also relates to a method for making a composition which includes combining polymethylmethacrylate and the organoclay functionalized with an intercalation agent described above to form combined materials and then mixing the combined materials at a temperature of at least 433° K. The present invention also relates to a method for forming transparent sheets from the polymethylmethacrylate/organoclay composition using known molding, casting, laminating or extrusion processes and the transparent sheets formed using this method.

BRIEF DESCRIPTION OF THE FIGURES

Other objects and many attendant features of this invention will be readily appreciated, as the invention becomes better understood by reference to the following detailed description when considered in connection with the accompanying drawings wherein:

FIG. 3a shows pure PMMA before combustion, FIG. 3b shows pure PMMA after combustion, FIG. 3c shows a PMMA nanocomposite before combustion, and FIG. 3d shows the PMMA nanocomposites after combustion.

DETAILED DESCRIPTION OF THEE NVNTION

Figure 1:
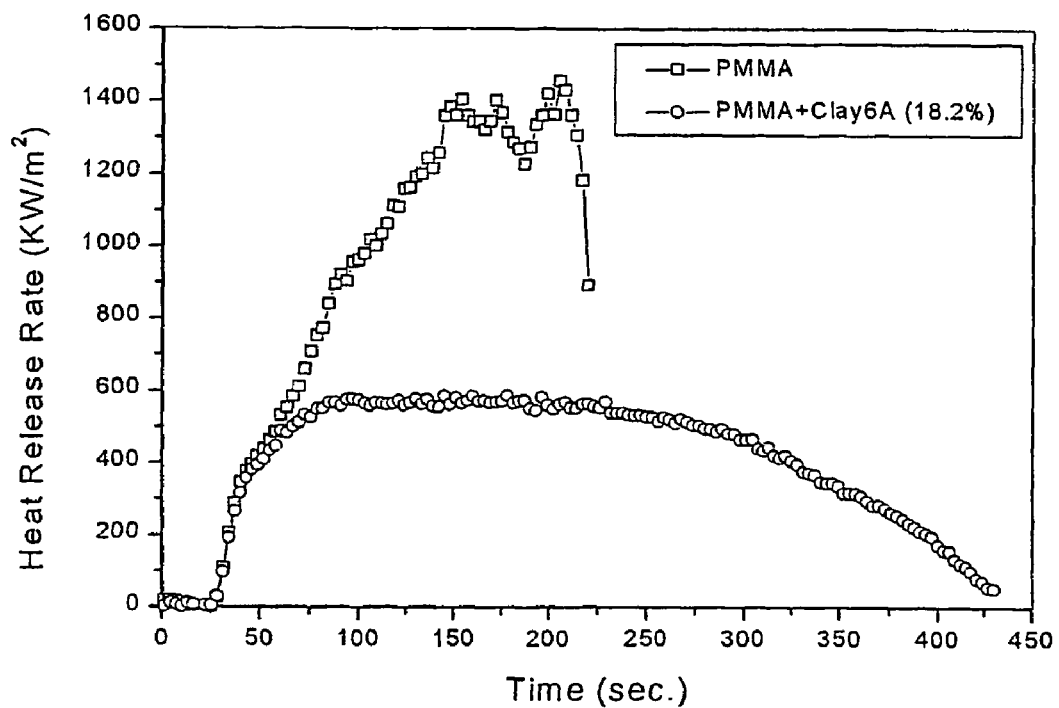
FIG. 1 is a graph of heat release rate data versus time for pure PMMA and a PMMA nanocomposite.

In the present invention, a clay/polymethylmethacrylate nanocomposites composition is produced wherein 70% of the clay particles are completely exfoliated, 27% are comprised of two or three platelets and 2% are intercalated multilayerd structures. Exfoliation of the clay results in a large improvement in thermal stability and UV absorption properties. This opens new markets for the composition formed from the clay/polymethylmethacrylate composite materials as a viable replacement for silicate glass in applications where optical clarity, UV, thermal resistance and shock absorbency are required.

The present invention is a composition or composite material composed of PMMA and a functionalized clay, preferably a functionalized montmorillonite clay, which increases flame retardancy by 200%, increases the specific heat, and provides UV absorbance higher than silicate glasses. Furthermore, this material is inexpensive to produce, extrudes more easily than PMMA, and is less susceptible to "Shark Skin" which disfigures the surfaces at high shear. The viscosity of the new material as well as the Young's modulus is the same as that of pure PMMA The composition is formed by mixing polymethylmethacrylate (PMMA) with functionalized clay, preferably functionalized montmorillonite clay, and most preferably Montmorillonite Cloisite 6A. When formed, the composition includes from about 50-98 wt %, PMMA and from about 2-50 wt % functionalized montmorillonite clay. Preferred compositions include from about 70-90 wt % PMMA and from about 10-30 wt % functionalized montmorillonite clay. The most preferred compositions include from about 80-84 wt % PMMA and from about 16-20 wt % functionalized montmorillonite clay. Testing has shown that the best results are achieved when the composition contains about 81.8 wt % PMMA and about 18.2wt % functionalized montmorillonite clay. The properties of the compositions demonstrate dramatic improvements over pure PMMA without a significant increase in cost.

The clay/polymethylmethacrylate compositions or composite materials of the present invention can be used to form transparent sheets. These sheets can be used for windows, especially in windshields for automobiles and other vehicles. The methods for fabricating the sheets and the different uses are similar to fabrication methods and uses for polymethylmethacrylate which are known to those skilled in the art. See, U.S. Pat. No. 6,132,882 to Landin et al., U.S. Pat. No. 4,303,739 to Beckmann et al. and U.S. Pat. No. 4,668,729 to Kataoka, all of which are incorporated herein by reference in their entirety.

In addition to being used in windshields and various types of windows, the PMMA nanocomposites of the present invention can also be used in lenses, aquariums, light covers, glazing (particularly in aircraft), light pipes, meter covers, bathroom fittings, outdoor signs, skylights, baths, toys, picture holders, jewelry, buttons, appliances, furniture, fixtures, lamps, novelty items, hairbrushes and any other product that is made with PMMA. The same methods that are used for fabricating articles, made from PMMA can be used to fabricate articles made with the PMMA nanocomposites of the present.

The functionalized montmorillonite clay includes an organoclay, which has been functionalized by an intercalation agent, whereby it has an affinity for other materials. The intercalation agent is a reaction product of a polyamine and an alkyl halide in a polar solvent. The preferred alkyl halides are alkyl chloride and alkyl bromide and the preferred polar solvents are water, toluene, tetrahydrofuran and dimethylformamide.

The functionalized montmorillonite clays of the present invention are made of particles having large surface areas with precisely controlled surface chemistry, which can be used to form new structure, property, and performance relationships. These new "structured clays" can be used to produce blend compositions with improved properties.

The functionalized montmorillonite clays are formed by first reducing the ionic forces which hold the layered clay platelets together to create spaces between the layers. A polymer blend intercalant is then introduced between the layers. The functional intercalant molecules penetrate the interstices of the clay galleries, and bind via electrostatic interactions, which renders the surfaces hydrophobic. The clay is then co-dissolved with the polymer blend intercalant in an organic solvent. The solvent causes the clay to exfoliate, thereby greatly increasing the surface to volume area.

The individual platelets of the clay are held together by strong-ionic forces. The key to producing the functionalized nanocomposite materials of the present invention is to reduce the interaction energy caused by these ionic charges efficiently and effectively. The ionic forces can be reduced considerably by screening the charges with a polar solvent such as water. In a dilute solution, the clay layers are substantially separated into individual layers. In order for the individual clay platelets to remain separated, a low molecular weight material is added to the solution. The preferred low molecular weight material is a cationic surfactant which intercalates (i.e., the cations diffuse along the planes of the crystal lattices, forming a layer between the planes) to the platelet surface, preventing the ionic charges from interacting when the solvent is removed. These functionalized clays can be solution or melt blended with PMMA and other polymers.

The coverage of the clay platelets with the functionalized groups is only partial, which results in the creation of hydrophobic and hydrophilic microscopic areas. These microscopic areas are used to bind the clay to PMMA or other polymers which results in a compatibilized blend of the clay and the polymers.

A preferred functionalized montmorillonite clay is a commercially available di-methyl, di-tallow ammonium functionalized montmorillonite clay. This material is relatively inexpensive (approximately $1.00/lb), and is often used as a packing material. This functionalized montmorillonite clay is commercially available from numerous manufacturers, such as American Colloid, Southern Clay Products and Sud Chemie. The nanocomposites of the present invention are described in U.S. Pat. No. 5,739,087 to Dennis, which is incorporated herein in its entirety by reference.

The Clay Component

The functionalized montmorillonite clays are formed from layered clays that are available throughout the world. The layered structures of these clays provide the PMMA/clay nanocomposites with unique properties. In their native state, the clay particles are made up of many layers of stacked platelets having a thickness of approximately 10 A which are held together by strong ionic forces.

The clay used as a starting material is a smectite-type clay. The unique characteristic of smectite that sets it apart from other minerals is its ability to disperse and swell in water and other polar liquids. There are many different types, or species, of smectite and the chemical nomenclature of smectite can vary and is, therefore, often misleading. The two species of smectite of the greatest commercial importance and value are montmorillonite (magnesium aluminum silicate) and hectorite (classified as magnesium silicate). This difference in chemical composition leads to a difference in crystal shape. Montmorillonites tend to have a sheet morphology; whereas, hectorite tends to have a lath or strip morphology. The commercial availability of hectorite is very limited, but montmorillonite deposits are vast.

The three properties that make smectite unique and commercially important are its particle size, particle shape and particle charge. Smectite crystals have a flat thin sheet morphology. They are irregular in overall shape and can be up to 1,000 nm (10,000 Angstroms) in the largest dimension. However, a side view of the crystal reveals a uniform size of 0.92 nm thickness. The result of this morphology is an extremely large surface area of about 800 square meters per gram. Surfaces of smectite particles tend to structure water that is in close proximity to them. Therefore, the greater the surface area, the greater the affect. Particle size is also important because dispersed smectite particles are in the colloidal range. The colloidal range is actually a gray zone in that the particles do not fit into well-defined categories. They are too big to be true solutions, but too small to have the bulk properties of larger particles. The key factor of the colloidal particle size is its interaction with gravity in a liquid. Not only does the resistance of the fluid impede the downward pull of the colloidal particle from gravity, but the impact of the molecules of the liquid upon the colloidal particles results in the continuous motion of the particle in the suspension. This phenomenon is known as the Brownian Motion.

Each crystal of montmorillonite has a large net negative charge. Thus, a montmorillonite crystal tends to attract any positive ions (cations), such as calcium or sodium ions, to its surface. If the majority of these cations are sodium, it is commonly referred to as a sodium bentonite (montmorillonite). If the majority of the ions on the clay surface are calcium, it is referred to as a calcium bentonite (montmorillonite). The net negative charge is located inside the crystal itself. Therefore, cations tend to be attracted to the surface of the particle in an effort to neutralize the charge. The edge of the crystal has a few positive charges thus attracting negatively charged ions or molecules.

The cations on the clay surface can be easily exchanged for other cations. A measure of this capacity is commonly referred to as the cation exchange capacity (CDC) and is usually expressed as milliequivalents of cations per hundred grams of clay.

The structure of montmorillonite or hectorite is such that it consists of an octahedral layer in between tetrahedral layers. The base unit of clay consists of three octahedral spaces plus their associated tetrahedral sheets. If two of the octahedral spaces in the unit cell are filled with alumina and the third is empty, it is said to be a dioctahedral smectite, that is a montmorillonite. If on the other hand, all three spaces of the octahedral are filled with magnesium, it is a trioctahedral smectite or hectorite.

The shape, size and charge of the smectite crystals have a great influence on determining what happens during hydration. This can best be demonstrated by discussing what happens to a single smectite crystal upon hydration. When a smectite crystal is introduced to water, the osmotic pressure differential of the water tends to diffuse the ions that are closely associated with the clay surface. These ions are associated with the clay surface due to the electrostatic surface charge. As the osmotic pressure pulls the ions away from the clay surface, the electrostatic charges tend to hold the ions close to the surface. Eventually there is a steady state achieved between the osmotic pressure and the electrostatic forces. This sets up what is commonly referred to as a double layer region. This double layer region tends to be an energy barrier regarding particles associating in a surface to surface configuration. If another particle is added to the bulk liquid, two things can happen. First, the particles can approach each other in a surface to surface configuration. In this case the double layers, consisting of cations, tend to repel one another. Second, the particles can approach each other from a surface to edge configuration. When this happens, a stable condition is established between the positive surface ions and the negative edge ions, thus setting up a "house of cards" structure. If enough clay is present, all of the water will be tied up in these double layers resulting in a gel formation (steady state).

Any disturbance of this steady state, such as shear, tends to disrupt the structure and aligns the clay particles. The net affect of this action is a reduction in the viscosity. This reduction will continue as long as shear is applied. However, as the shear force decreases, the particles tend to orient themselves, as before, that is a surface to edge configuration, and the viscosity is increased. After a period of time, the viscosity is essentially the same as the original viscosity. This phenomenon is known as thixotropy. Thixotropy is one of the most important properties of smectite.

Intercalation Reactions

In an intercalation reaction, the intercalant (i.e., extra atoms or molecules) are introduced between the layers of a layered host compound. The intercalation reaction does not require the breaking of any strong chemical bonds and, therefore, the kinetic barrier to reaction is usually minimal and intercalation reactions proceed rapidly at low temperature, even at room temperature. The reaction takes place at the edges of the layers of the solid host compound, and the intercalant rapidly defuses into the interior of the host. In order for the reaction to spontaneously proceed, there must be a lowering of the free energy due to intercalation. This energy decrease is chemical or electrostatic in nature, and it must be large enough to overcome the small energy necessary to pry the layers apart. Usually, the intercalation process is reversible, even at room temperature, if a chemical or electrochemical driving force is applied. The physical properties of the host or the intercalant are often greatly changed by forming an intercalation compound.

Synthesis of Functionalized Montmorillonite Clay

In forming the functionalized montmorillonite clay of the present invention, the preferred intercalation agent is a reaction product of a polyamine and an alkyl halide in a polar solvent. However, a variety of intercalants having a wide range of structures can be synthesized. These intercalants possess a multi-charged structure that ensures an efficient intercalation process as well as effective bonding to the clay surface. In addition, these intercalants provide the capability to predictably control the distance between charges because their molecules have a uniform length, which provides uniform spacing between the clay layers. The intercalants can also be used to modify the hydrophobicity of the molecule through changes in the length of the alkyl groups and to "add" chemically reactive groups. These latter three factors can be used to control the level of interaction with the polymer matrix. For example, for a very hydrophobic polymer material, a long alkyl length would ensure good adhesion to the clay platelets, i.e., polyethylene, polypropylene, and elastomers. Conversely, a short alkyl sequence would be used to effectively disperse the clay in a polymer material that is more polar in nature, i.e., polyesters and nylons.

The synthesis procedure for the cationic intercalants includes the reaction of a polyamine with an alkyl halide (typically an alkyl bromide) in a polar solvent such as tetrahydrofuran. Preferably, the alkyl halide ion possesses a carbon length of from 2 to 22 carbon atoms. After the reaction, the reaction product is isolated with a nonsolvent and dried.

Conventional intercalation agents that are presently being used are cationic compounds. A typical structure for a conventional intercalation agent is shown in equation 1.

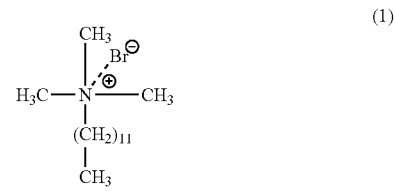

(1)

The intercalation agents of the present invention can be either reactive or nonreactive multichain cationic intercalation agents. A typical nonreactive multichain cationic intercalation agent is shown in equation 2 and a typical reactive multichain cationic intercalation agent is shown in equation 3.

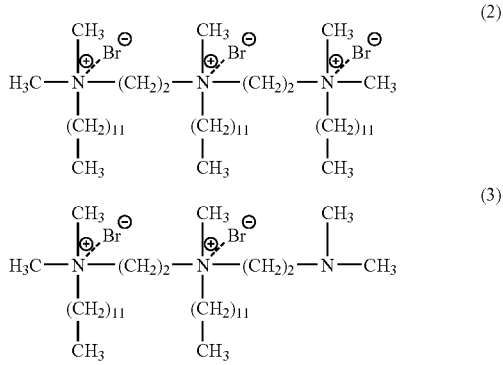

The modified intercalation agents of the present invention contain a bromine (Br) radical, which allows further functionalization. For example, by adding maleic acid groups, oligomers can be polymerized directly on the clay platelets. Other groups, such as sulfonic groups, can be attached to the intercalation agents and react with the bromine radical to bind the clay to the polymer matrix. Groups can also be added to change the surface energy of the clay and thus increase the adsorbtion of polymer to the clay surface. Examples of such groups are carboxylic acid, which attracts pyridine-containing polymers or hydroxy groups that increase the surface energy and promote adsorbtion of lower energy polymers.

In order to enhance the compatibility with the polymer matrix through strong clay-polymer interaction, a wide variety of functional groups can be introduced, including ionic, hydrogen-bonding, polar, and chemically reactive functionalities. The polar and chemically active functional groups can react with functionalities present in most commercial polymers. Vinyl groups have a particularly-potent reactive functionality and can bond to preformed polymers through well-known free radical procedures. These vinyl-containing clays can be copolymerized with a wide variety of commercially available monomers to produce polymer/clay compounds that are capable of forming nanocomposites in a one step process. These polymer/clay compounds contain very low volume fractions of filler and they have the added features of lightweight, good dispersability, good processability, and ease of manufacturing by conventional techniques.

EXAMPLE 1

In this example, a material of the present invention was made by mixing 81.8 wt % of polymethylmethacrylate from Aldrich Chemical Company, (lot # 10815ES, avg. molecular weight~120,000) in a twin screw Brabender extractor with 18.2 wt % Montmorillonite Cloisite 6A (Clay lot # 20000626XA-001 from Southern Clay Products, Inc.) at a temperature of 433-443° K. with a shear rate of 20 RPM for 1 minute, then at 100 RPM for 10 minutes. The material was then subjected to various testing procedures that included Cone Calorimetry, TEM, UTVIIS absorption, FT-IR and SAXS.

EXAMPLE 2

Figure 2:
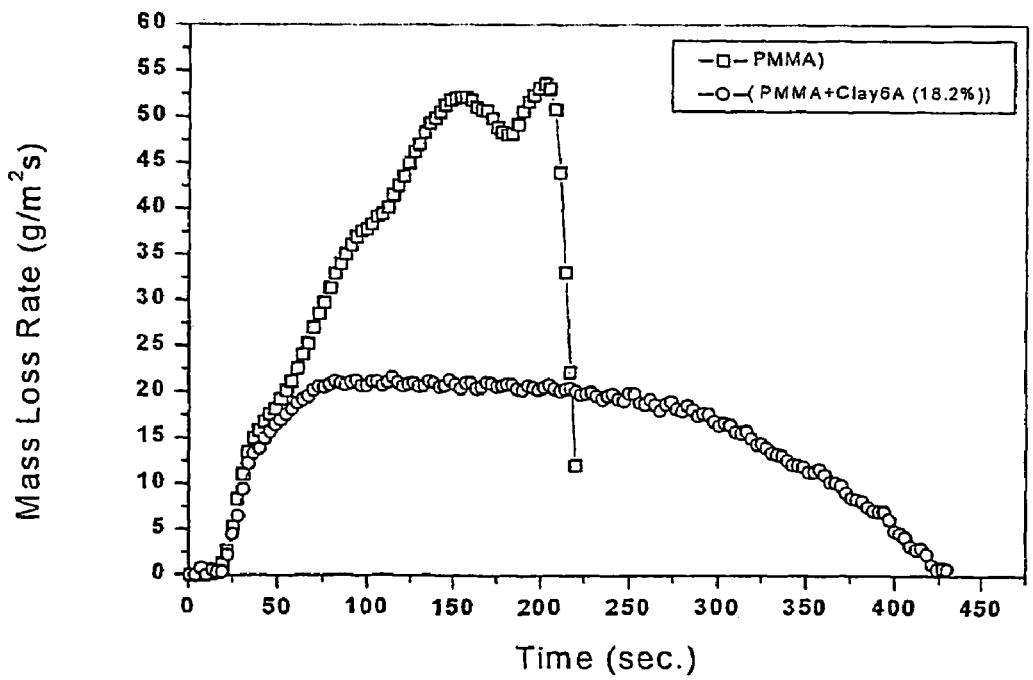
FIG. 2 is a graph of mass loss rate data versus time for pure PMMA and PMMA nanocomposite.

The Cone Calorimetry test was conducted at an incident heat flux of 50 kW/m$^2$ in National Institute of Standards and Technology for the material formed in Example 1. The results are tabulated in Table 1 and plotted in FIGS. 1 and 2. FIG. 1 shows that the heat release rate (HRR) is far lower and more gradual in the PMMA/clay nanocomposite. This trend is also apparent in the mass loss rate (MLR) shown in FIG. 2.

TABLE 1

Cone Calorimetry Test Data For Pure PMMA and PMMA-Clay Nanocomposites

|  | Peak Heat Release Rate (kW/m$^2$) | Average Heat Release Rate (kW/m$^2$) | Average Specific Extinction Area (m$^2$/Kg) | Average Mass Loss Rate (g/s · m$^2$) |
|---|---|---|---|---|
| PMMA | 1456.79 | 975.5 | 159.13 | 43.932 |
| PMMA/Clay Nanocomposites | 586.32 | 435.24 | 317.59 | 19.351 |

Figure 3A:
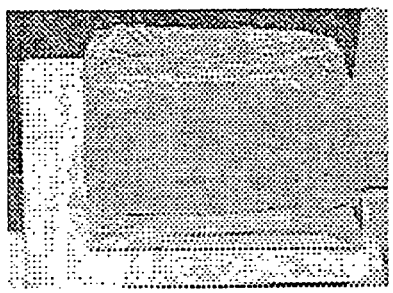
FIGS. 3a to 3d are photographs of the PMMA and a PMMA nanocomposite before and after combustion.
Figure 3B:
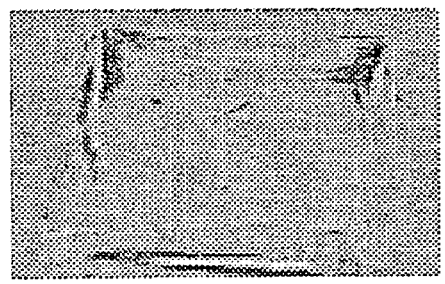
Figure 3C:
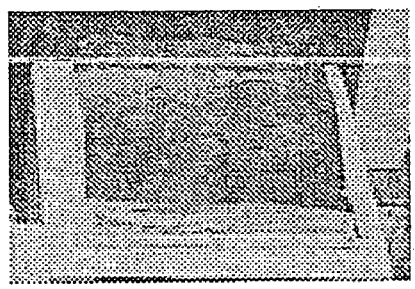
Figure 3D:
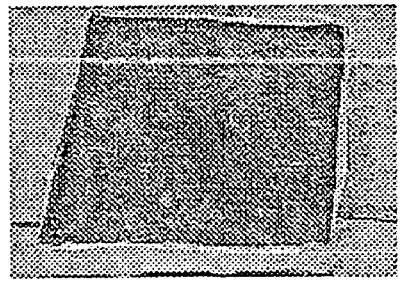

The data in Table 1 shows that the peak and average values of the BRR are reduced in the PMMA clay nanocomposite by a factor of 2.5 and 2.2 respectively. The average specific extinction area of the nanocomposite relative to PMMA is increased by a factor of 2.0 while the average MLR is reduced by a factor of 2.3. FIGS. 3a-d are photographs of the samples before and after combustion for different times. FIG. 3b shows that after 200 seconds the pan containing the pure-PMMA is empty with the PMMA having been completely converted to ash. FIG. 3d shoes that the tray containing the nanocomposite still has half of the original material remaining after 430 seconds. These data clearly indicate that the introduction of Cloisite 6A dramatically improves the flame retardation of PMMA.

EXAMPLE 3

Figure 4:
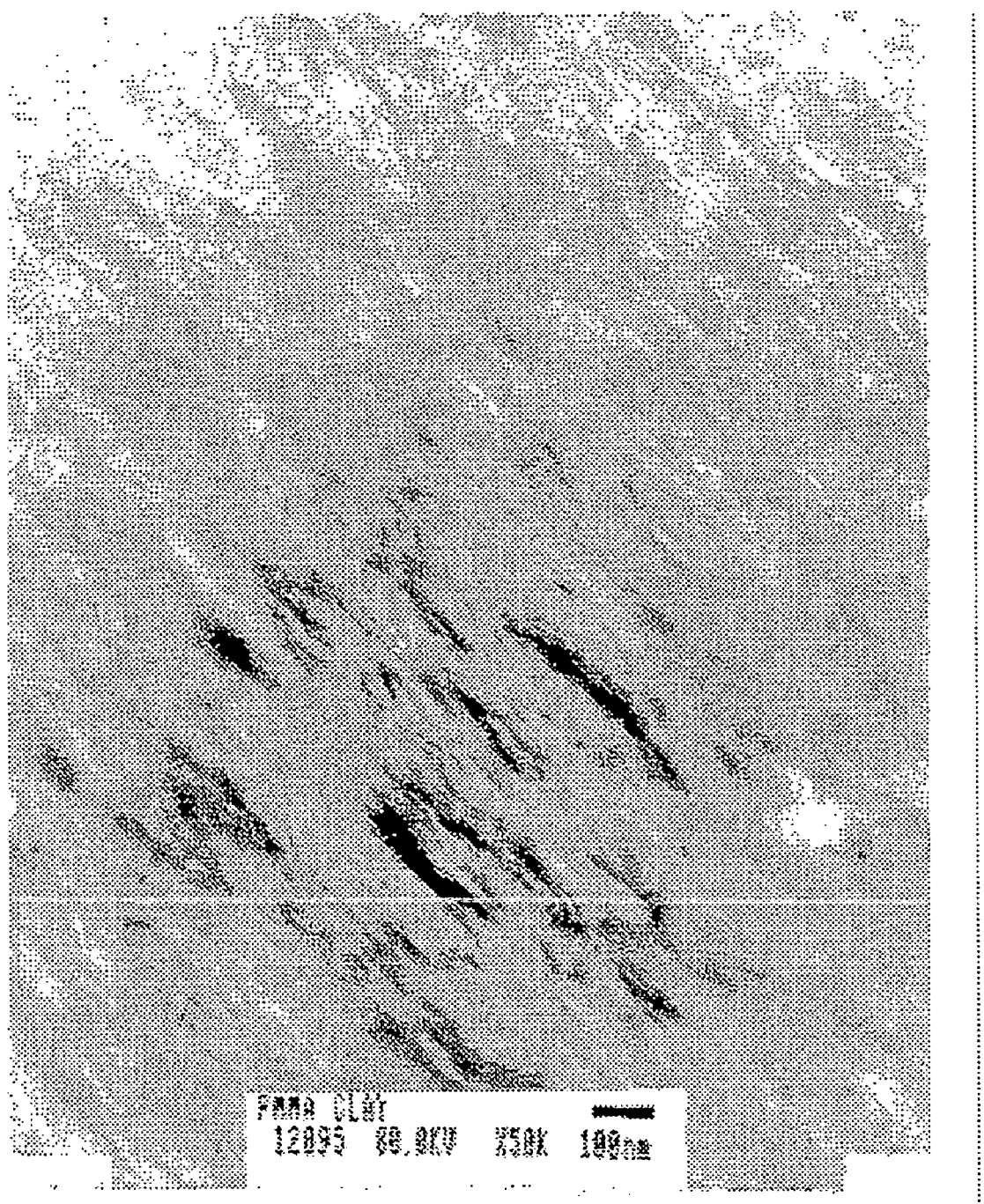
FIG. 4 is a photograph of a transmission electron microscopy (TEM) image of a cross-section of a PMMA nanocomposite at a magnification of 50,000.
Figure 5:
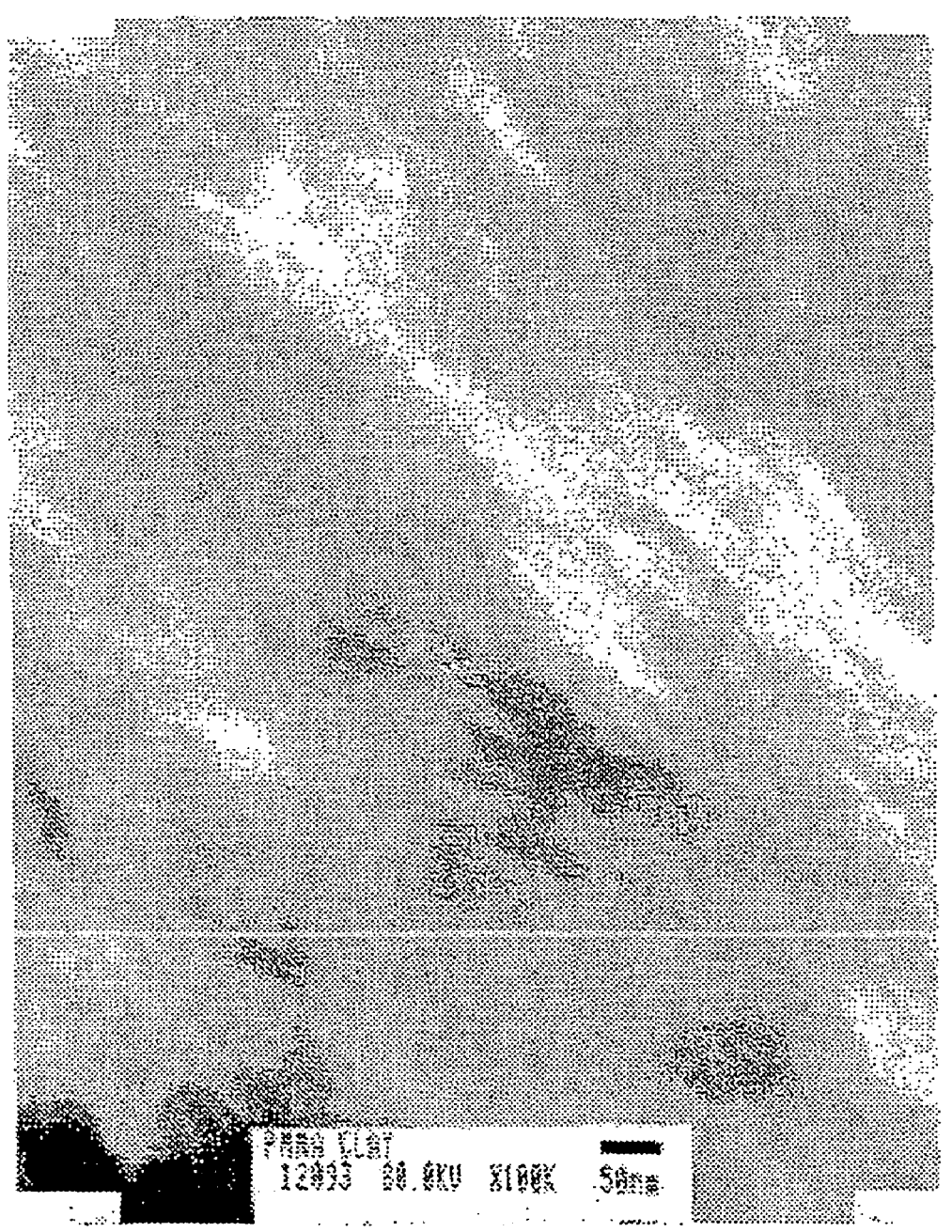
FIG. 5 is a photograph of a TEM image of a cross-section of a PMMA nanocomposites at a magnification of 100,000.

The compositions in Example 1 were formed into molded materials and cross-sections were sliced on a Reichert Microtome with a diamond knife. Transmission Electron Microscopy (TEM) images of the cross-sections are shown in FIGS. 4 and 5. From these figures, the degree to which the process exfoliates the clay can be estimated. Examination of the figures shows that: 70 percent of the clay platelets observed are fully exfoliated and aligned normal to the direction of the molding force, 15 percent are tactoids with two layers, 12 percent have three layers, and 2 percent have more than 3 layers. When two or more layers are produced, the interlayer spacing is 4.43 nm as compared to the interlayer spacing of pure Cloisite 6A of 3.50 mL The increased spacing is in agreement with X-ray diffraction data and indicates that the process also produced partial intercalation.

EXAMPLE 4

Figure 6:
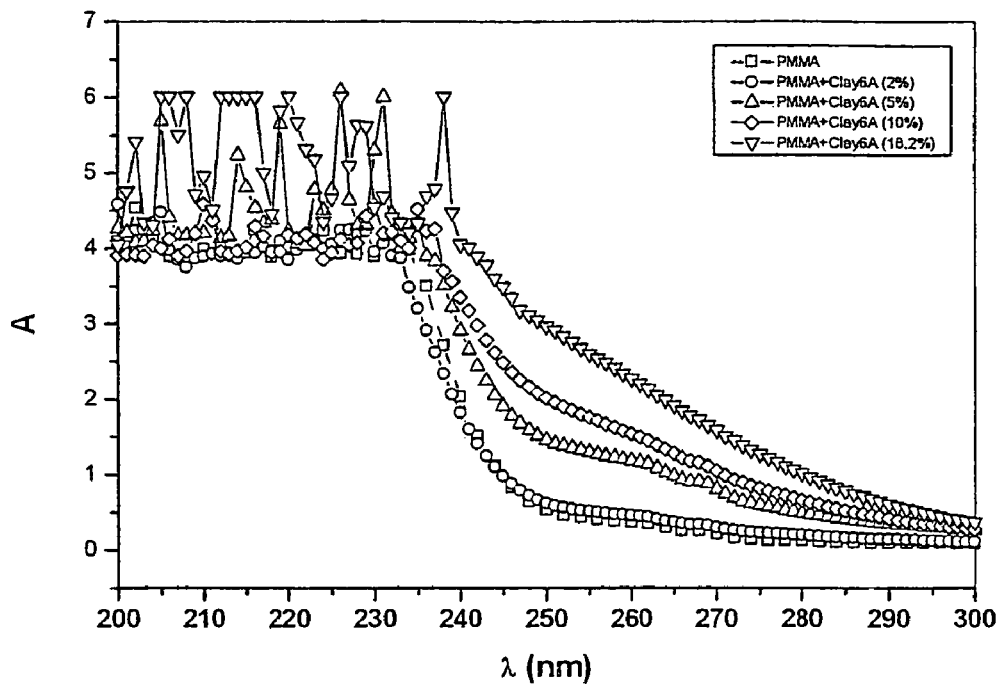
FIG. 6 is a graph of absorption versus wavelength for ultraviolet-visible light (UV-VIS) spectrum of PPMA and PMMA nanocomposites with different amounts of clay.

Pure PMMA and PMMA/clay compositions containing 2%, 5%, 10% and 18.2% clay were molded into thin strips, 0.003 inch thick, and the ultraviolet (UV) characteristics were measured on Perkin Elmer UV-VIS Spectrometer. The results are plotted in FIG. 6. The figure shows that with the addition of clay, the UV absorption is increased for the entire wavelength spectrum with increasing clay weight fraction. When the clay weight fraction is greater than 2%, the UV absorption increases by at least two orders of magnitude and can no longer be measured by the instrument. FIG. 6 also shows that the onset of absorption occurs at increasingly higher wavelengths, which indicates that the amount of clay is not sufficient to absorb all of the incident UV rays. (The activation of energy level of PMMA would absorb some of the UV rays.) Due to the interaction of clay and PMMA, the double bonds of PMMA were probably broken and the onset of UV-VIS absorption of PMMA nanocomposite shifted to low-energy side. The results are tabulated in Table 2.

TABLE 2

Measured Values Of Onset Wavelength For Absorption Of Pure PMMA And PMMA-Clay Nanocomposites

|  | PMMA | PMMA + Clay (2%) | PMMA + Clay (5%) | PMMA + Clay (10%) | PMMA + Clay (18.2%) |
|---|---|---|---|---|---|
| Onset wavelength of absorption (nm) | 245 | 246 | 265 | 273 | 280 |

EXAMPLE 5

Figure 7:
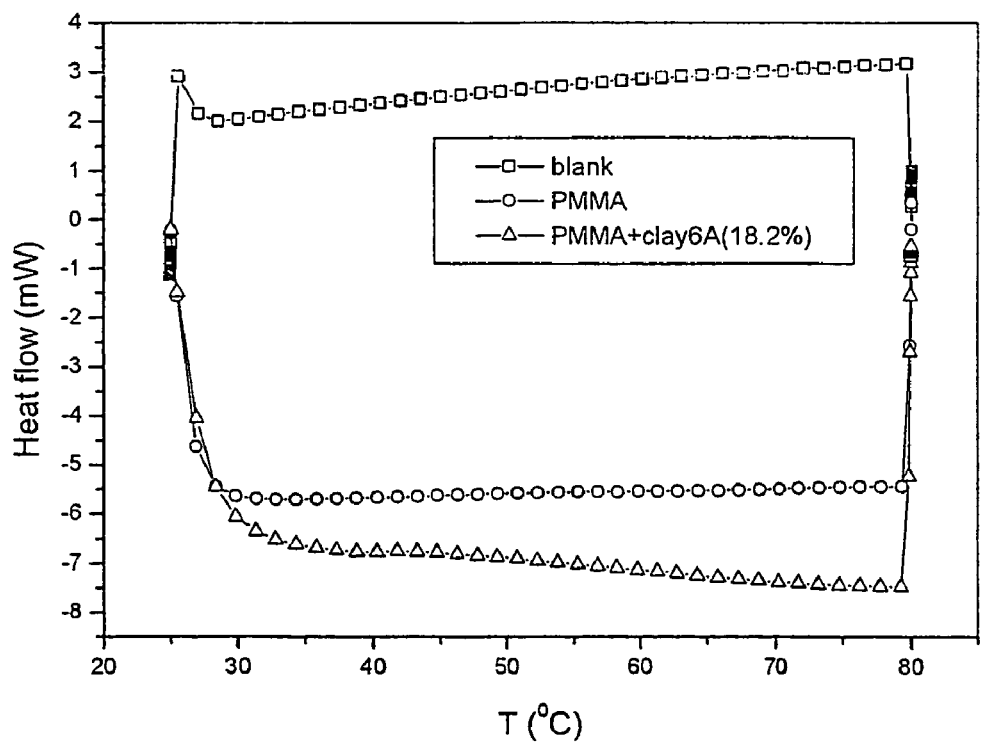
FIG. 7 is DSC is a graph of heat flow versus temperature curve of pure PMMA and a PMMA nanocomposite.
Figure 8:
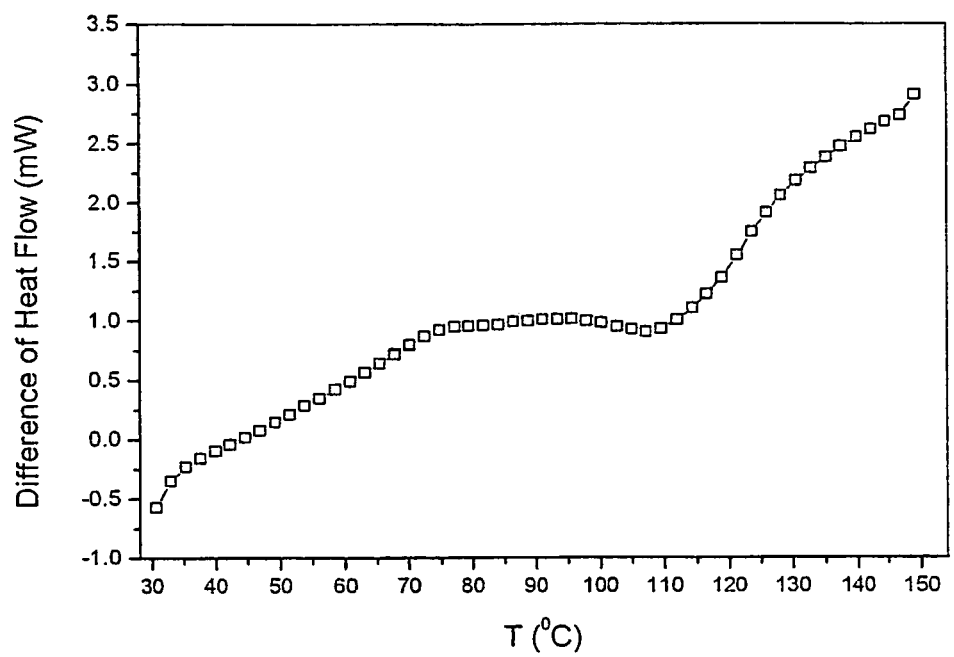
FIG. 8 is a graph of the difference of heat flow between pure PMMA and a PMMA nanocomposite versus temperature.

Samples of about 20 grams of the composition formed in Example 1 and pure PMMA were inserted into a calibrated aluminum pan and the heat capacity was measured using a Mettler Toledo DSC 821e. The results are shown in FIG. 7 and Table 3. FIG. 7 shows that the heat flow difference (that is dH/dt) between blank and PMMA nanocomposite is much higher than that of blank and pure PMMA. Based on the specific heat calculation equation, Cp=dH/dt.dt/dT.1/m, it's clear that the introduction of clay increases the specific heat of PMMA. The results in Table 3 and FIG. 8 show that the change in specific heat increases with temperature. At 50° C., the change is only 9.7% while at 70° C. it has increased to 23%.

TABLE 3

Specific Heat Data Of Pure PMMA and PMMA-Clay Nanocomposites

|  | 50° C. (KJ/Kg · K) | 60° C. (KJ/Kg · K) | 70° C. (KJ/Kg · K) |
|---|---|---|---|
| PMMA | 1.43 | 1.46 | 1.51 |
| PMMA/Clay Nanocomposite | 1.57 | 1.67 | 1.85 |

EXAMPLE 6

Figure 9:
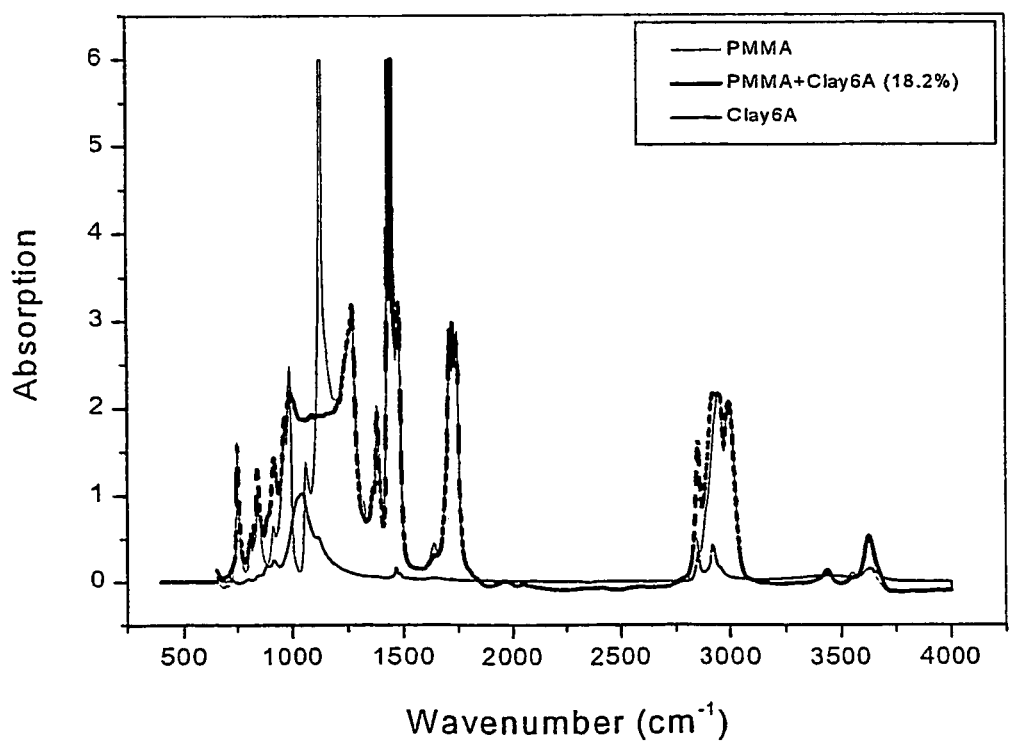
FIG. 9 is a graph of absorption versus wavenumber for the Fourier Transform-Infrared Spectroscopy (FT-IR) spectrum of pure PMAA, pure clay and a PMMA nanocomposite.

In order to determine whether the improvement in properties is simply additive with the clay or due to a change in the chemical nature of the PMMA, samples of pure PMMA, pure clay and the composition formed in Example 1 were analyzed with Fourier Transform Infrared Spectroscopy (FT-IR). Samples were pressed into thin films, 0.003 inch thick, and measured on Magnar-IR® FT-IR Spectrometer. The results are shown in FIG. 9 where the FTIR spectra for pure PMMA, Cloisite 6A and the nanocomposite are shown. FIG. 9 shows that the peaks of pure PMMA at 1059, 1133 cm$^{-1}$ are not present in the nanocomposite. Similarly, the peaks at observed in pure clay are not visible. The peaks observed indicate that the PMMA double bond may be broken as the material interacts with the surfactant functionalities on the clay surfaces. This interaction possibly may be the cause for the large degree of exfoliation. Furthermore, by eliminating the double bond it makes the material more UV and flame resistant.

EXAMPLE 7

Small Angle X-ray Scattering (SAXS) measurements were performed at the X27C Beamline in Synchrotron Light Source, Brookhaven National Laboratory on samples of pure clay and a PMMA clay composition containing 10% clay.

Figure 10:
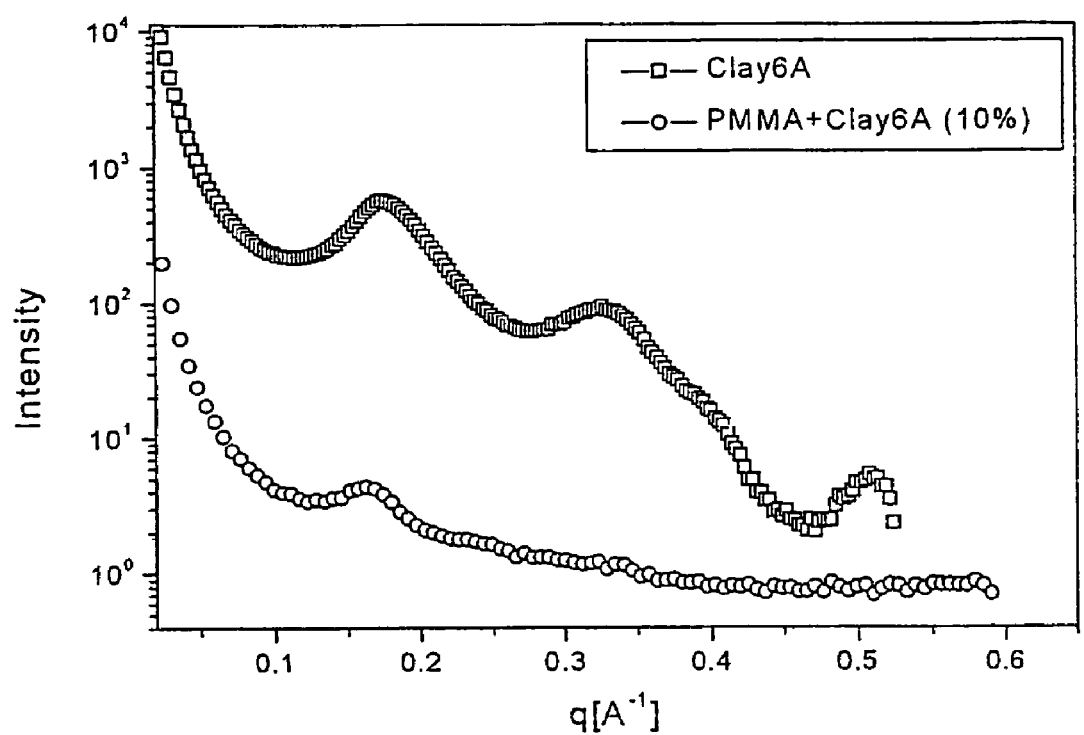
FIG. 10 is a graph of small angle X-ray scattering (SAXS) patterns for PMMA and a PMMA nanocomposite.

The wavelengths of 1.366 Angstrom and image plate detection were used. SAXS results are illustrated in FIG. 10. Compared to pure PMMA, the overall scattering intensity of PMMA nanocomposites is very low and the peak maximum are slightly shifted towards lower q values, which means higher gallery spacing. The low scattering intensity is indicative of a largely exfoliated clay structure and it will not contribute to the coherent scattering signals. The shift of the scattering maximum to the low q values suggests that part of the clay structure is intercalated as the gallery spacing distance increases, which is coincident with the results from the TEM images.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A composition consisting essentially of polymethylmethacrylate and an organoclay functionalized with an intercalation agent, wherein said intercalation agent is a reaction product of a polyamine and an alkyl halide in a polar solvent, and wherein the composition is formed by mixing the polymethylmethacrylate and the organoclay functionalized with the intercalation agent, wherein the composition is simultaneously heated and mixed at temperatures of at least 433° K. and at shear rates of at least 20 revolutions per minute (RPM), wherein the composition has increased thermal stability and UV adsorption properties compared to polymethylmethacrylate.

2. A composition as described in claim 1, wherein said alkyl halide is alkyl chloride or alkyl bromide.

3. A composition as described in claim 1, wherein said polar solvent is selected from the group consisting of water, toluene, tetrahydrofuran and dimethylformamide.

4. A composition as described in claim 1, wherein said organoclay is montmorillonite clay.

5. A composition as described in claim 1, wherein said organoclay is a di-methyl, di-tallow ammonium functionalized montmorillonite clay.

6. A composition as described in claim 1, comprising from about 50-98 weight percent polymethylmethacrylate and from about 2-50 weight percent organoclay.

7. A composition as described in claim 1 comprising from about 70-90 weight percent polymethylmethacrylate and from about 30-10 weight percent organoclay.

8. A composition as described in claim 1 comprising from about 80-84 weight percent polymethylmethacrylate and from about 16-20 weight percent organoclay.

9. A method for making a composition consisting essentially of:

combining polymethylmethacrylate and an organoclay functionalized with an intercalation agent to form combined materials, wherein said intercalation agent is a reaction product of a polyamine and an alkyl halide in a polar solvent; and simultaneously heating and mixing the combined materials at a temperature of at least 433° K. and at a shear rate of at least 20 RPM, wherein the composition has increased thermal stability and UV adsorption properties compared to polymethylmethacrylate.

10. A method for making a composition as described in claim 9, wherein said alkyl halide is alkyl chloride or alkyl bromide.

11. A method for making a composition as described in claim 9, wherein said polar solvent is water, toluene, tetrahydrofuran or dimethylformamide.

12. A method for making a composition as described in claim 9, wherein said organoclay is montmorillonite clay.

13. A method for making a composition as described in claim 9, wherein said organoclay is a di-methyl, di-tallow ammonium functionalized montmorillonite clay.

14. A method for making a composition as described in claim 9, wherein said combined materials comprise from about 50-98 weight percent polymethylmethacrylate and from about 2-50 weight percent organoclay.

15. A method for making a composition as described in claim 9, wherein said combined materials comprise from about 70-90 weight percent polymethylmethacrylate and from about 30-10 weight percent organoclay.

16. A method for making a composition as described in claim 9, wherein said combined materials comprise from about 80-84 weight percent polymethylmethacrylate and from about 16-20 weight percent organoclay.

17. A transparent sheet consisting essentially of polymethylmethacrylate and an organoclay functionalized with an intercalation agent, wherein said intercalation agent is a reaction product of a polyamine and an alkyl halide in a polar solvent.

18. A transparent sheet as described in claim 17, wherein said alkyl halide is alkyl chloride or alkyl bromide.

19. A transparent sheet as described in claim 17, wherein said polar solvent is selected from the group consisting of water, toluene, tetrahydrofuran and dimethylformamide.

20. A transparent sheet as described in claim 17, wherein said organoclay is montmorillonite clay.

21. A transparent sheet as described in claim 17, wherein said organoclay is a di-methyl, di-tallow ammonium functionalized montmorillonite clay.

22. A transparent sheet as described in claim 17 comprising from about 50-98 weight percent polymethylmethacrylate and from about 2-50 weight percent organoclay.

23. A transparent sheet as described in claim 17 comprising from about 70-90 weight percent polymethylmethacrylate and from about 30-10 weight percent organoclay.

24. A transparent sheet as described in claim 17 comprising from about 80-84 weight percent polyinethylmethacrylate and from about 16-20 weight percent organoclay.

25. A method for forming a transparent sheet comprising:
forming a composition consisting essentially of polymethylmethacrylate and an organoclay functionalized with an intercalation agent, wherein said intercalation agent is a reaction product of a polyamine and an alkyl halide in a polar solvent; and simultaneously heating and mixing and heating said composition at a temperature of at least 433° K. and at a shear rate of at least 20 RPM; and molding said composition to form said transparent sheet, wherein said transparent sheet has increased thermal stability and UV adsorption properties compared to a transparent sheet formed from polymethylmethacrylate.

* * * * *